US007608318B2

(12) United States Patent
Akishev et al.

(10) Patent No.: US 7,608,318 B2
(45) Date of Patent: Oct. 27, 2009

(54) SANDWICH PANEL

(75) Inventors: Niaz Irekovich Akishev, Kazan (RU); Ildus Muhametgaleevich Zakirov, Kazan (RU); Alexandr Vladimirovich Nikitin, Kazan (RU)

(73) Assignees: Airbus, Blagnac (FR); Otkrytoe Aktsionernoe Obschestvo "Kazansky Nauchno - Isledovatelsky Institut Aviatsionnoi Tekhnologii", Kazan (RU)

( * ) Notice: Subject to any disclaimer, the term of this patent is extended or adjusted under 35 U.S.C. 154(b) by 459 days.

(21) Appl. No.: 10/582,784

(22) PCT Filed: Dec. 17, 2003

(86) PCT No.: PCT/RU03/00553

§ 371 (c)(1),
(2), (4) Date: Jun. 13, 2006

(87) PCT Pub. No.: WO2005/058593

PCT Pub. Date: Jun. 30, 2005

(65) Prior Publication Data

US 2007/0148412 A1    Jun. 28, 2007

(51) Int. Cl.
*B32B 3/28* (2006.01)
*E04C 2/32* (2006.01)
*B31F 1/00* (2006.01)

(52) U.S. Cl. .................. 428/138; 428/179; 428/182; 428/183; 156/204; 156/205; 52/783.17

(58) Field of Classification Search ................. 428/137, 428/138, 179, 182, 183; 52/783.11, 783.17; 156/204, 205, 257, 292
See application file for complete search history.

(56) References Cited

U.S. PATENT DOCUMENTS

| 2,963,128 | A | * | 12/1960 | Rapp ......................... 428/594 |
| 3,158,527 | A | * | 11/1964 | Koeller et. al. .............. 428/181 |
| 3,341,395 | A | * | 9/1967 | Weber ........................ 428/134 |
| 4,227,356 | A | * | 10/1980 | Stern et al. ................. 52/309.4 |

FOREIGN PATENT DOCUMENTS

| DE | 27 09 025 | 9/1978 |
| JP | 10-305497 | 11/1998 |

* cited by examiner

*Primary Examiner*—Donald Loney
(74) *Attorney, Agent, or Firm*—Oblon, Spivak, McClelland, Maier & Neustadt, L.L.P.

(57) ABSTRACT

The invention can be defined in its most general form as a building unit, namely the sandwich panel with light core from corrugated sheet material in the form of zigzag crimp, and can be used in aircraft construction, as well as in shipbuilding and construction. Making use of the claimed invention will improve the weight efficiency, the strength and the manufacturability of the panel. The beneficial effect is attained due to the fact that the plane slanting ridges are connected along the protrusion and recess zigzag lines by means of curvilinear parts, whose radius is not less than the core material thickness, whereby along said parts is a line perforation enabling the adhesive material to get into the holes of the perforation in the course of core-skins assembling.

3 Claims, 2 Drawing Sheets

A-A

B - B

SANDWICH PANEL

TECHNICAL FIELD

The invention can be defined in its most general form as a building unit, namely the sandwich panel with light core from corrugated sheet material in the form of zigzag crimp.

BACKGROUND ART

Known is a sandwich panel including the outer skins connected with the core layer while said core is obtained by means of sheet blank bending along the marked-out on the development zigzag lines of protrusions and recesses (Inventors' certificate SU no. 1,785,154. Method for production of curvilinear sandwich panel with zigzag corrugated core.—Int. Cl.: B 23 K 20/00.—Bulletin no. 28 of 30 Jul. 1993).

The main short-comings of herein-presented panel are low strength and reliability of skin-core bonding due to small contact area.

Known is a sandwich panel with light core from corrugated sheet material (RF Patent no. 2,038,265 C1. Sandwich panel.—Int. Cl.: B 64 C 3/26.—Published on 27 Jun. 1995). With the aim to enlarge the contact area of the core with the lower skin, the crimp ridges are made in the form of lenticular elements placed at the recesses of side ridges, whereas located between the side ridges of the core at its vertices curvilinear composite material enlarges the contact area of the core with the upper skin.

The main short-comings of herein-presented panel are the loss of simplicity of the core shaping along the recesses lines of the crimps and high labor expenditures for performing the contact areas along the protrusions lines; it results in writing up of the panel in whole.

Taken as a prototype is a sandwich panel including the skins and placed between said skins zigzag corrugated core with alternating protrusions and recesses containing going along said protrusions and recesses triangular grooves filled with adhesive composite material (Inventors' certificate RF no. 1,646,196 A1. Sandwich panel.—Int. Cl.: B 64 C 3/26.—Bulletin no. 36 of 27 Dec. 1996).

The main short-coming of herein-presented panel is the complexity of the crimp shape in its lateral section which requires some sophisticated and expensive shaping tooling for production of core. Moreover, technological hardships make it impossible to produce the grooves on the protrusions and recesses of the crimp at its relatively small height. The extra fold in the crimp shape brings down the core block height accuracy; it adversely affects the quality of the panel. Technically realizable dimensions of the grooves section increase the area and, therefore, the mass of the core which requires the increased application of adhesive composite material which also adversely affects the weight efficiency of the panel.

DISCLOSURE OF INVENTION

The invention has for its object to increase the strength of folded core-skin bonding.

The technical result attained at executing of the claimed invention is the improvement of unit-weight properties of the panel owing to decrease of the core and adhesive materials mass.

The stated technical result is attained by that in the known sandwich panel, including the skins connected with placed between said skins zigzag corrugated core having the alternating protrusions and recesses with the use of adhesive composite material, the plane slanting ridges are connected in-between along the protrusions and recesses zigzag lines by means of curvilinear parts, whose radius is not less than the core material thickness, whereas along said parts made is the line perforation providing the adhesive material get into the holes of the perforation in the course of core-skins assembling.

The undertaken by the applicant state of the art analysis shows that there are no analogs characterized by the combination of the features identical to those of the invention. Therefore, the claimed technical solution satisfies the "novelty" condition of patentability.

The results of retrieval for the known solutions in the given area with the aim to reveal the features identical with distinctions of the claimed technical solution show that its features do not result from the state of the art. From the defined state of the art the applicant managed to reveal no influence of the specified essential features upon the attainment of the stated technical result. The claimed technology, therefore, satisfies the "inventive step" condition of patentability.

BRIEF DESCRIPTION OF DRAWINGS

The FIGS. 1-4 present the essence of the invention.

Figure 1:
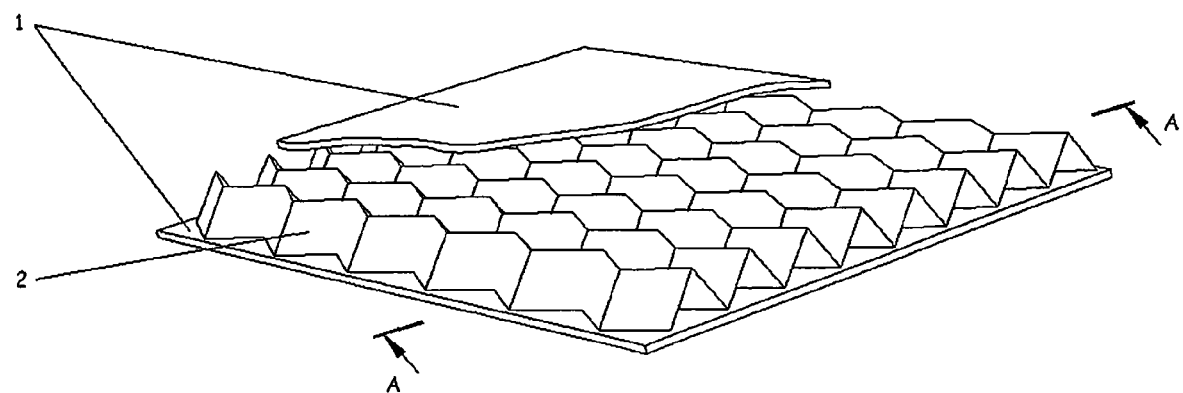
FIG. 1 presents a general view of the panel with zigzag folded core.
Figure 2:
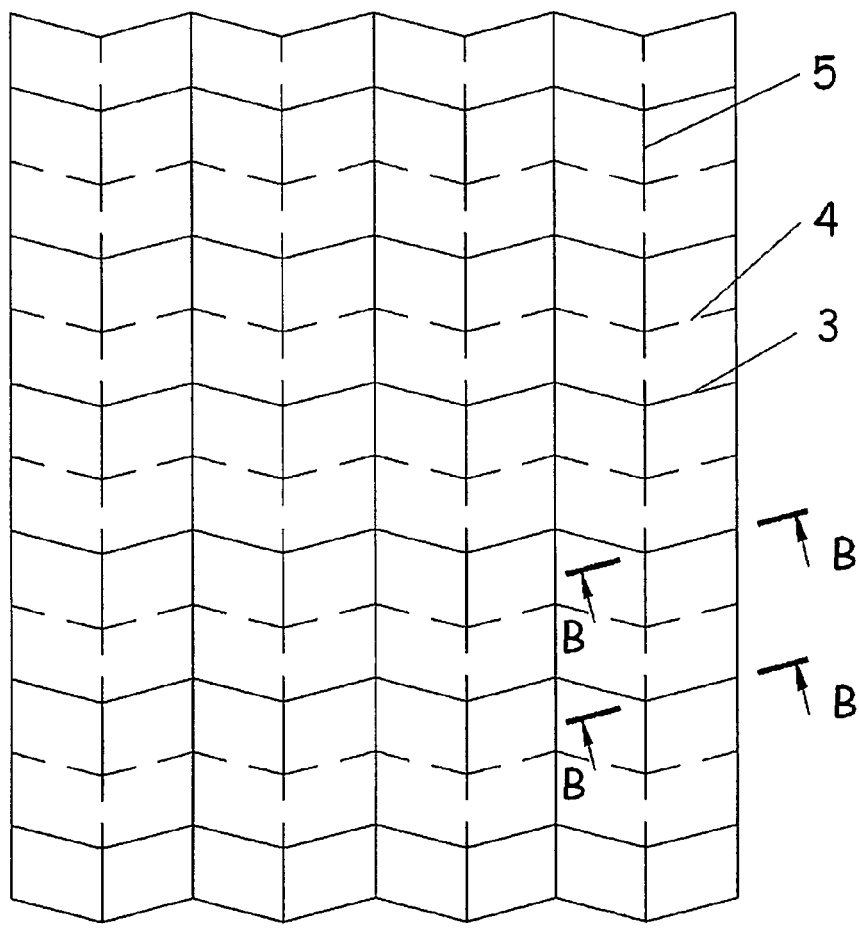
FIG. 2 shows the core plane blank with the perforation along the zigzag bending lines.
Figure 3:
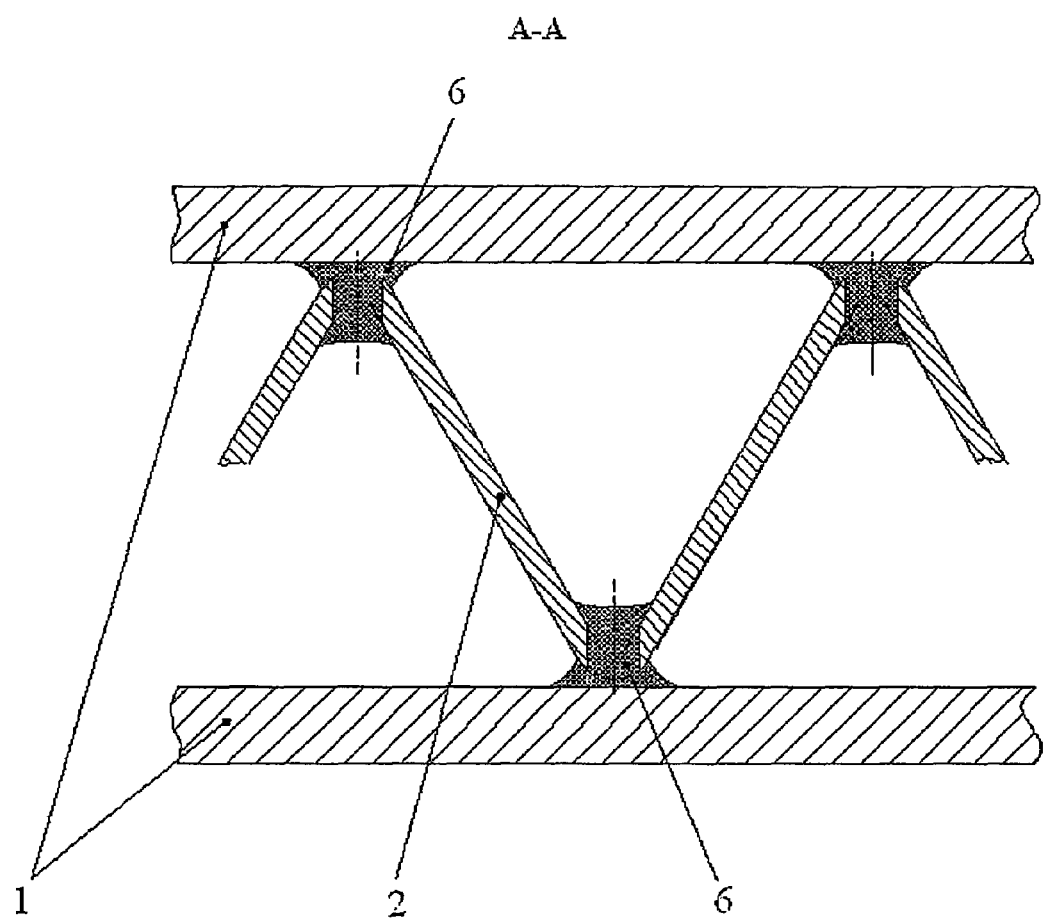
FIG. 3 is a sectional view A-A of FIG. 1 presenting the core-skin bonding along the zigzag lines along the perforation.
Figure 4:
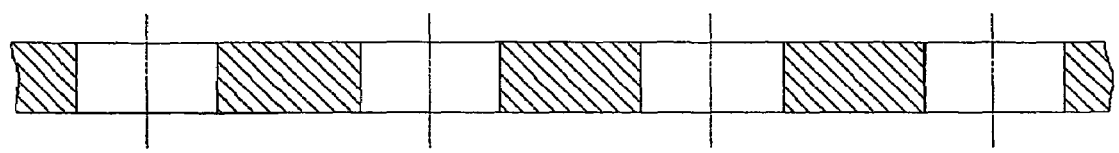
FIG. 4 is sectional view B-B of FIG. 2.

The FIGS. 1-4 present the following positions:

1 is the lower and the upper skins; 2 is the corrugated core; 3 are the crimp protrusions zigzag lines; 4 are the recesses zigzag lines; 5 are the crimp saw-tooth lines; 6 is the adhesive composite material.

BEST MODE FOR CARRYING OUT THE INVENTION

The sandwich panel includes the skins 1 (the upper skin is not shown) and the folded core 2 with zigzag crimps, in the form of alternating protrusions and recesses, which is obtained by means of sheet blank bending along the lines 3, 4 and 5. Passing through the lines 3 and 4 plains form the plane sides whose intersection traces represent the saw-tooth and zigzag lines of crimps. Taking place on the core material curvilinear bending parts along the crimp lines 3 and 4 is the line perforation which is made in the core blank material in its developed (before the shaping) state. Along the lines 3 and 4 the corrugated core 2 is connected with the skins 1 with the use of composite adhesive material 6. At the same time the area of each perforated hole, the consistency of the adhesive material 6 and its mass are taken so that to provide the adhesive compound get through said holes into the crimps wherein said compound forms a drop; in the course of glue polymerization after core-skins bonding said drop forms the head and the body of the rivet.

Partial crippling of the material due to the perforation on the core ridges does not adversely affect upon the panel strength properties since its shear strength is mainly determined by the quality of the slight-slanted core elements, i.e. ridges. The ridges serve as the surfaces of the core-skin bonding and to a small extent determine the sandwich panel strength. On the whole, the claimed method allows to improve the quality of the panel owing to increase of the glued joint strength on account of "riveted bonding" and to increase the panel weight efficiency owing to decrease of the core material mass and the adhesive material.

INDUSTRIAL APPLICABILITY

The claimed invention can be used in aircraft construction, as well as in shipbuilding and construction.

The invention claimed is:

1. A sandwich panel, comprising:
   two skins; and
   a zigzag corrugated core having alternating protrusions and recesses extending between the skins and connected to the skins by an adhesive composite material, wherein
   the core is a folded core made from a sheet blank with protrusions zigzag bending lines, recesses zigzag bending lines, and saw-tooth bending lines crossing the zigzag bending lines,
   plane slanting sides of the folded core are connected to each other along the protrusions zigzag bending lines and the recesses zigzag bending lines by curvilinear parts whose folded core radius along the zigzag bending lines is not less than a core material sheet blank thickness,
   perforation lines provided along the zigzag bending lines enable penetration of the adhesive material through holes of the perforation lines and into crimps, and
   the adhesive material forms a head and body of a rivet in the crimps during assembly of the core and the skins.

2. The sandwich panel core according to claim 1, formed by a process comprising:
   forming perforation lines on the sheet blank along the zigzag bending lines;
   bending the sheet blank along the zigzag bending lines;
   applying the adhesive material into each of the perforation lines;
   applying the skins to the top and bottom of the core; and
   bonding the skins to the core at locations of the perforation holes.

3. The sandwich panel core according to claim 1, wherein ridges serve as surfaces of bonding between the core and the skins.

\* \* \* \* \*